(12) United States Patent
Yang (10) Patent No.: US 7,675,845 B2
(45) Date of Patent: Mar. 9, 2010

(54) METHOD AND APPARATUS FOR SPACE-TIME CODING AND DECODING

(75) Inventor: Yuli Yang, Shenzhen (CN)

(73) Assignee: Huawei Technologies Co., Limited, Shenzhen (CH)

( * ) Notice: Subject to any disclaimer, the term of this patent is extended or adjusted under 35 U.S.C. 154(b) by 242 days.

(21) Appl. No.: 11/924,307

(22) Filed: Oct. 25, 2007

(65) Prior Publication Data

US 2009/0116375 A1    May 7, 2009

Related U.S. Application Data

(63) Continuation of application No. PCT/CN2007/070403, filed on Aug. 1, 2007.

(30) Foreign Application Priority Data

Oct. 25, 2006    (CN) .................. 2006 1 0150417

(51) Int. Cl.
    *H04J 11/00* (2006.01)
(52) U.S. Cl. .............. 370/208; 370/252; 370/334; 375/219; 375/260; 455/59; 455/63.1
(58) Field of Classification Search ......... 455/59
    See application file for complete search history.

(56) References Cited

U.S. PATENT DOCUMENTS 6,865,373 B2 *   3/2005   Tong et al. ............. 455/63.1

2003/0133516 A1   7/2003   Alamouti et al. ......... 375/295
2004/0002364 A1*  1/2004   Trikkonen et al. ....... 455/562.1
2004/0120274 A1*  6/2004   Petre et al. ............. 370/320
2004/0240571 A1* 12/2004   Murakami et al. ........ 375/260
2005/0013352 A1*  1/2005   Hottinen ................. 375/219
2005/0281350 A1* 12/2005   Chae et al. ............. 375/267
2006/0050804 A1   3/2006   Leclair .................. 375/267

FOREIGN PATENT DOCUMENTS

CN    1509544    6/2004
CN    1685651    10/2005

* cited by examiner

*Primary Examiner*—Chi H. Pham
*Assistant Examiner*—Shick Hom
(74) *Attorney, Agent, or Firm*—Darby & Darby (57) ABSTRACT

The present invention relates to methods for space-time coding and decoding in a wireless communication system with multiple antennas including: generating an orthogonal matrix according to signals to be transmitted; generating a coefficient matrix corresponding to the orthogonal matrix according to channel status information received; and generating a transmission matrix according to the orthogonal matrix and the coefficient matrix; performing a weight-combination for received signals according to channel status information in a receiver; and obtaining estimations of transmitted signals corresponding to the received signals by performing detection for the received signals. The present invention also provides apparatuses for space-time coding and decoding. By applying the present invention, the bit error rate of a system is reduced and bit error performance of the system is improved. And the transmission rate of the system is increased remarkably when there are more than one complex signals to be transmitted.

9 Claims, 4 Drawing Sheets

METHOD AND APPARATUS FOR SPACE-TIME CODING AND DECODING

CROSS-REFERENCE TO RELATED APPLICATIONS

This is a continuation of International Application No. PCT/CN2007/070403, filed Aug. 1, 2007, which claims the benefit of Chinese Patent Application No. 200610150417.1, filed Oct. 25, 2006, the entire disclosures of which are incorporated herein by reference.

BACKGROUND OF THE INVENTION

1. Field of the Technology

The present invention relates to wireless communication technologies, and more particularly, to methods and apparatuses for space-time coding and decoding.

2. Background of the Technology

Along with the development of wireless communication technologies, a wireless communication system is expected to support higher communication quality and a higher data rate. In the wireless communication system, time and frequency resources are limited, so that a Multiple Input Multiple Output (MIMO) system is developed. And extensive attention is paid to the MIMO system which provides remarkable improvement in channel capacity.

Diversity techniques are generally adopted in MIMO systems for achieving better signal transmission quality. However, since size of a mobile terminal is limited and there is not enough space for multiple antennas to ensure independence of communication channels, receiver diversity can not be implemented in downlink channels. Base stations are capable of processing multiple transmission antennas, so that space-time coding technologies are usually adopted for implementing transmission diversity in the wireless communication system with multiple antennas.

At present, a Space-Time Block Code (STBC) has become a main technology adopted for implementing transmission diversity, because the STBC has relatively low complexity to implement.

However, bit error rates (BERs) of systems remain high when conventional STBC algorithms are adopted. Therefore, receiver performance of the systems is poor and development of the wireless communication systems with multiple antennas is limited.

Further, when signals to be transmitted in a system are at least two complex numbers, the transmission rate of the system is relatively low.

Taking the STBC for two antennas as an example, a transmission matrix is:

$$\begin{pmatrix} x_1 & x_2 \\ -x_2^* & x_1^* \end{pmatrix}$$

Here, $x_1$ and $x_2$ respectively indicate two signals to be transmitted in a base station, and * indicates a conjugate operation.

Figure 1:
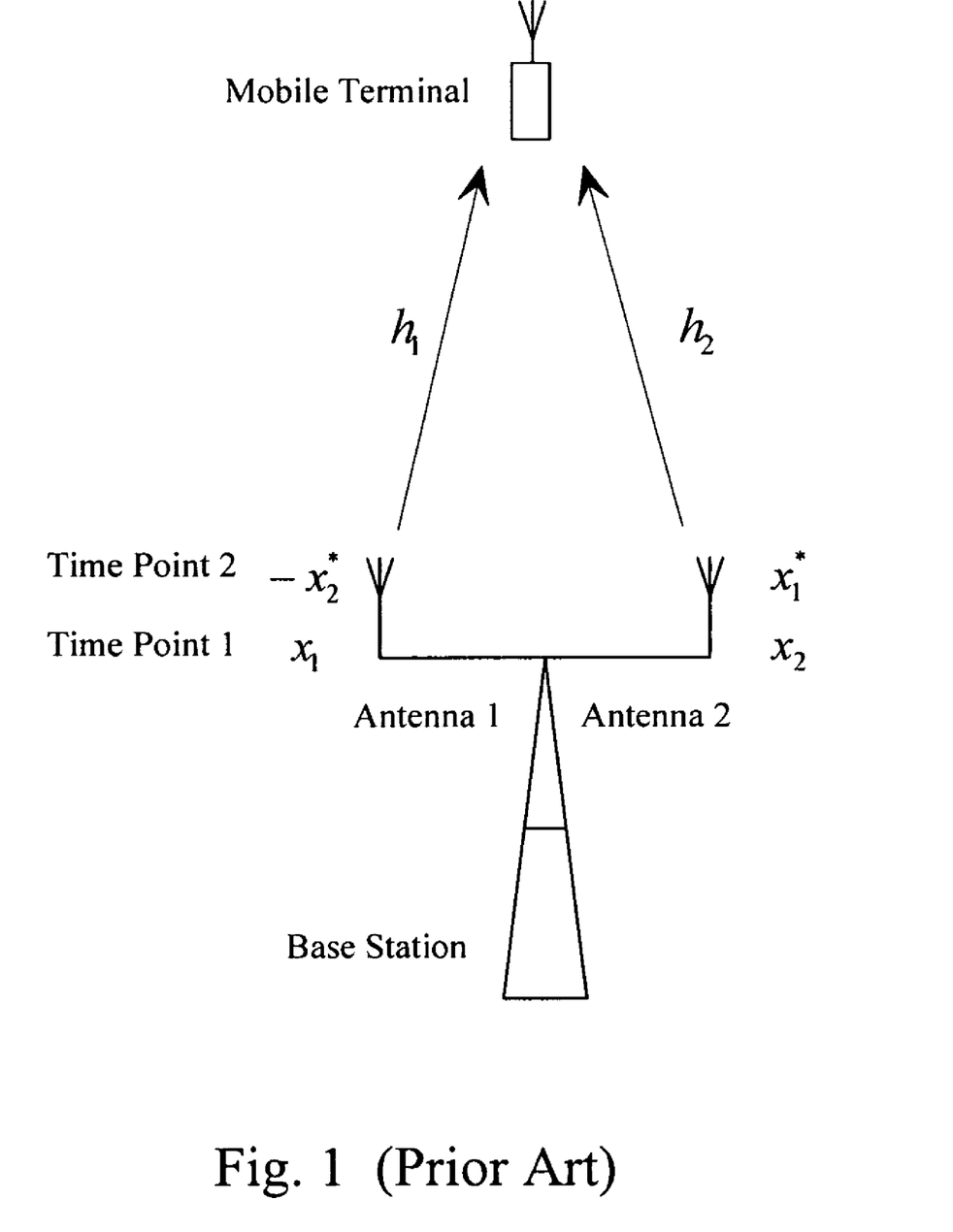
FIG. 1 is a schematic diagram illustrating a structure of a conventional STBC system with two antennas.

FIG. 1 shows a structure of an STBC algorithm. Detailed descriptions of the algorithm are shown as follows.

In Time Period 1, $x_1$ is transmitted to Mobile Terminal via Antenna 1 and $x_2$ is transmitted to Mobile Terminal via Antenna 2 in Base Station, and signals received by the Mobile Terminal are:

$$r_1 = h_1 x_1 + h_2 x_2 + n_1$$

In Time Period 2, $-x_2^*$ is transmitted to Mobile Terminal via Antenna 1 and $x_1^*$ is transmitted to Mobile Terminal via Antenna 2 in Base Station, and signals received by Mobile Terminal are:

$$r_2 = -h_1 x_2^* + h_2 x_1^* + n_2$$

Here, $h_1$ indicates a parameter of a flat fading channel from Antenna 1 to Mobile Terminal and $h_2$ indicates a parameter of a flat fading channel from Antenna 2 to Mobile Terminal, i.e. channel status information, $r_m$ and $n_m$ respectively indicate the signals and Additive White Gaussian Noise (AWGN) received by Mobile Terminal in Time Period m (m=1,2).

The receiver computes signals to be tested, i.e. $\hat{x}_1$ and $\hat{x}_2$, as follows:

$$\hat{x}_1 = h_1^* r_1 + h_2 r_2^*$$

$$\hat{x}_2 = h_2^* r_1 - h_1 r_2^*$$

Finally, Mobile Terminal may respectively perform detection for the original signals sent by Base Station, i.e., $x_1$ and $x_2$, according to the maximum likelihood rule.

The STBC algorithm is further explained with reference to a system with four antennas. A transmission matrix is:

$$\begin{bmatrix} x_1 & x_2 & x_3 & x_4 \\ -x_2 & x_1 & -x_4 & x_3 \\ -x_3 & x_4 & x_1 & -x_2 \\ -x_4 & -x_3 & x_2 & x_1 \\ x_1^* & x_2^* & x_3^* & x_4^* \\ -x_2^* & x_1^* & -x_4^* & x_3^* \\ -x_3^* & x_4^* & x_1^* & -x_2^* \\ -x_4^* & -x_3^* & x_2^* & x_1^* \end{bmatrix},$$

Here, $x_1$, $x_2$, $x_3$ and $x_4$ respectively indicate four signal stobe transmitted in a base station, and * indicates a conjugate operation.

Signals received by a mobile terminal in 8 consecutive time periods are as follows:

$$r_1 = h_1 x_1 + h_2 x_2 + h_3 x_3 + h_4 x_4 + n_1$$

$$r_2 = -h_1 x_2 + h_2 x_1 - h_3 x_4 + h_4 x_3 + n_2$$

$$r_3 = -h_1 x_3 + h_2 x_4 + h_3 x_1 - h_4 x_2 + n_3$$

$$r_4 = -h_1 x_4 - h_2 x_+ h_3 x_2 + h_4 x + n_4$$

$$r_5 = h_1 x_1^* + h_2 x_2^* + h_3 x_3^* + h_4 x_4^* + n_5$$

$$r_6 = -h_1 x_2^* + h_2 x_1^* - h_3 x_4^* + h_4 x_3^* + n_6$$

$$r_7 = -h_1 x_3^* + h_2 x_4^* + h_3 x_1^* - h_4 x_2^* + n_7$$

$$r_8 = -h_1 x_4^* - h_2 x_3^* + h_3 x_2^* + h_4 x_1^* + n_8$$

Here, $h_m$ indicates a parameter of a flat fading channel from a antenna m (m=1, 2, 3, 4) in a base station to the mobile terminal, and $r_m$ and $n_m$ respectively indicate the signals and Additive White Gaussian Noise received by the mobile terminal in the time period m(m=1, 2, 3, 4, 5, 6, 7, 8).

The system with four antennas computes the four signals to be tested, i.e. $\hat{x}_1$, $\hat{x}_2$, $\hat{x}_3$, $\hat{x}_4$, as follows:

$$\hat{x}_1 = h_1^* r_1 + h_2^* r_2 + h_3^* r_3 + h_4^* r_4 + h_1 r_5^* + h_2 r_6^* + h_3 r_7^* + h_4 r_8^*$$

$$\hat{x}_2 = h_2^* r_1 - h_1^* r_2 - h_4^* r_3 + h_3^* r_4 + h_2 r_5^* - h_1 r_6^* - h_4 r_7^* + h_3 r_8^*$$

$$\hat{x}_3 = h_3^* r_1 + h_4^* r_2 - h_1^* r_3 - h_2^* r_4 + h_3 r_5^* - h_4 r_6^* - h_1 r_7^* - h_2 r_8^*$$

$$\hat{x}_4 = h_4^* r_1 - h_3^* r_2 + h_2^* r_3 - h_1^* r_4 - h_4 r_5^* - h_3 r_6^* - h_2 r_7^* - h_1 r_8^*$$

It can be seen that, when signals to be transmitted are complex numbers and the number of antennas is larger than two in an MIMO system, the transmission rate of the system is half of the transmission rate of a Single Input Single Output (SISO) system, thus the transmission rate of the MIMO system is reduced.

Therefore, when the conventional STBC algorithm is adopted in the system, the bit error rate of the system is high. Further, the transmission rate of the system is low when signals to be transmitted are more than one complex numbers.

SUMMARY OF THE INVENTION

Embodiments of the present invention provide methods and apparatuses for space-time coding and decoding in a wireless communication system with multiple antennas, therefore, the bit error rate of a system is reduced.

A method for space-time coding includes:

generating an orthogonal matrix for signals to be transmitted;

generating a coefficient matrix corresponding to the orthogonal matrix according to channel status information; and generating a transmission matrix according to the orthogonal matrix and the coefficient matrix.

A method for space-time decoding includes:

performing a weight-combination for received signals according to channel status information; and obtaining estimations of transmitted signals corresponding to the received signals by performing detection for the received signals.

An apparatus for space-time coding includes:

an orthogonal matrix generating module, for generating an orthogonal matrix for signals to be transmitted;

a coefficient matrix generating module, for generating a coefficient matrix corresponding to the orthogonal matrix according to channel status information; and a transmission matrix generating module, for generating a transmission matrix according to the orthogonal matrix and the coefficient matrix.

An apparatus for space-time decoding includes:

a received signals combination module, for performing a weight-combination for received signals according to channel status information; and a signal detection module, for obtaining estimations of transmitted signals corresponding to the received signals by performing detection for the received signals.

It can be seen from the above technical scheme, in embodiments of the present invention, signals to be transmitted are space-time coded according to channel status information obtained by a transmitter. Therefore the bit error rate of a system is reduced and bit error performance of the system is improved.

Further, in the embodiments of the present invention, the signals to be transmitted are space-time coded according to the channel status information obtained by the transmitter, and conjugate operations for the signals to be transmitted are avoided. When the signals to be transmitted are more than one complex signals, the transmission rate of the system is increased remarkably.

DETAILED DESCRIPTION OF THE PREFERRED EMBODIMENT

In space-time coding techniques provided by embodiments of the present invention, signals to be transmitted are space-time coded according to channel status information obtained by a transmitter, and the bit error performance of a system is improved. Furthermore, when the signals to be transmitted in the system are complex numbers and the number of antennas set in the system is larger than two, the transmission rate of the system is increased according to the embodiments of the present invention.

By applying the embodiments of the present invention, the transmission rates of MIMO systems is equivalent to transmission rates of SISO systems regardless of the number of transmission antennas.

Figure 2:
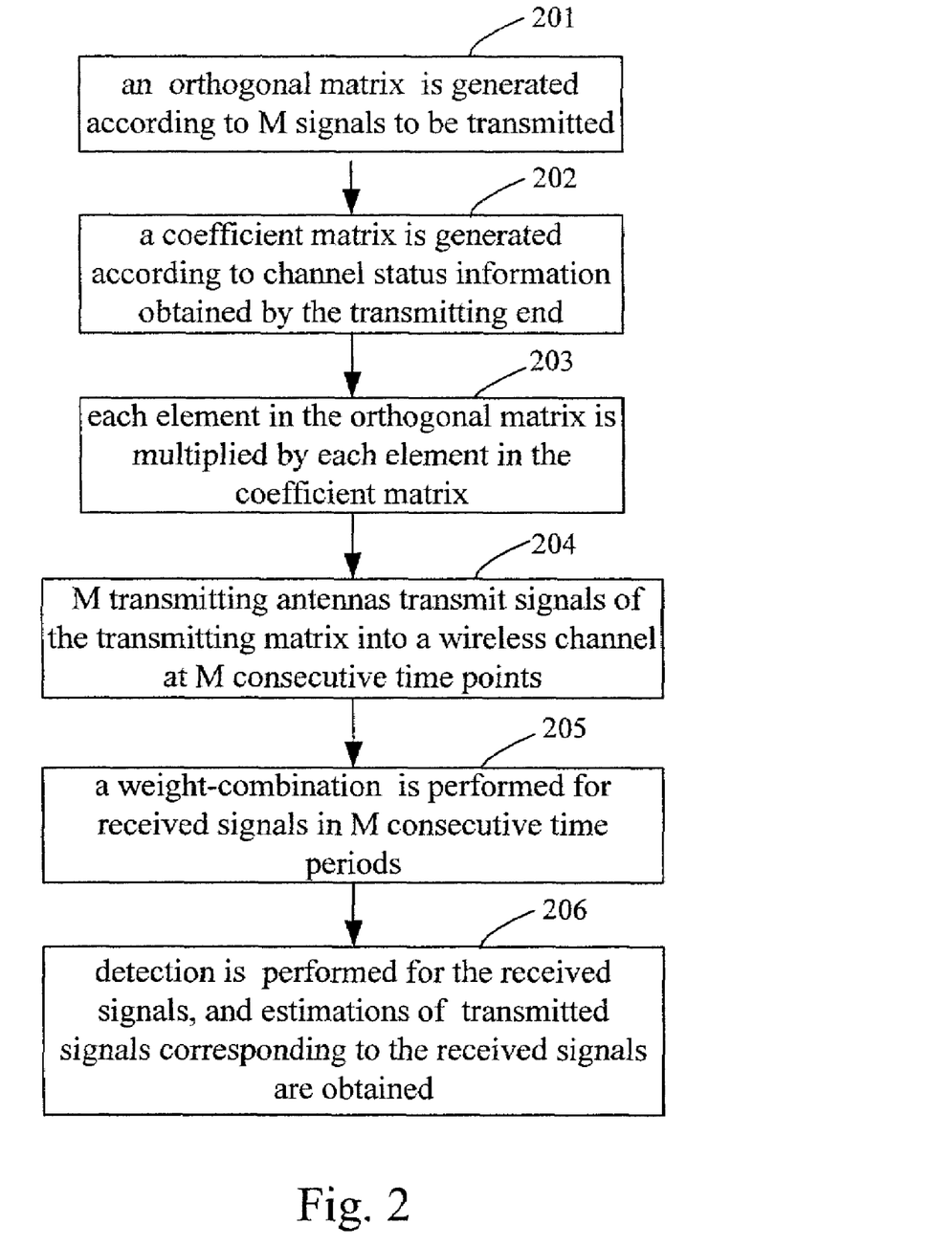
FIG. 2 is a flowchart of a method of space-time coding and decoding in accordance with an embodiment of the present invention.

FIG. 2 is a flowchart of a method of space-time coding and decoding in accordance with an embodiment of the present invention. In a wireless MIMO system, there are one receiver antennas and M transmission antennas, and M is an integer larger than 2, such as 2, 3, 4, etc. As shown in FIG. 2, the method of space-time coding and decoding in accordance with an embodiment of the present invention includes the following process.

At block 201, an M×M orthogonal matrix X is generated for M signals to be transmitted.

Presume that the system includes M transmission antennas, and generates an orthogonal matrix according to the M signals to be transmitted, the first row of the orthogonal matrix includes the M signals to be transmitted $x_1, x_2, \ldots, x_M$, and each of the other rows includes different arrangements of the M signals and reverse values of the M signals, i.e., the M×M matrix includes $\pm x_1, \pm x_2, \ldots, \pm x_M$.

At block 202, coefficients corresponding to each element in the orthogonal matrix are computed according to channel status information obtained by a transmitter to generate a coefficient matrix. In this embodiment, the coefficient matrix is:

$$\begin{pmatrix} h_1^* & & & \\ & h_2^* & & \\ & & \ddots & \\ & & & h_M^* \end{pmatrix} \text{ or } \frac{\sqrt{M}}{\sqrt{\sum_{m=1}^{M} |h_m|^2}} \begin{pmatrix} h_1^* & & & \\ & h_2^* & & \\ & & \ddots & \\ & & & h_M^* \end{pmatrix}$$

Here, $h_m$ is a flat fading channel parameter from the number $m (m=1, 2, \ldots, M)$ transmission antenna to the receiver, and the $h_m$ is used as channel status information. The matrixes above satisfy the Maximal Ratio Combining principle.

At block 203, the orthogonal matrix X is premultiplied by the coefficient matrix, and each element in the orthogonal matrix is multiplied by the element in the coefficient matrix corresponding to the element in the orthogonal matrix. Therefore, a transmission matrix is generated. In this embodiment, the transmission matrix is:

$$X \begin{pmatrix} h_1^* & & & \\ & h_2^* & & \\ & & \ddots & \\ & & & h_M^* \end{pmatrix} \text{ or } \frac{\sqrt{M}}{\sqrt{\sum_{m=1}^{M} |h_m|^2}} X \begin{pmatrix} h_1^* & & & \\ & h_2^* & & \\ & & \ddots & \\ & & & h_M^* \end{pmatrix}$$

Here, the rows of the transmission matrix correspond to signals transmitted by the M transmission antennas in the same time period, and the columns of the transmission matrix correspond to signals transmitted by a transmission antenna in M consecutive time periods.

At block 204, signals are transmitted according to the transmission matrix.

The M transmission antennas transmit signals of the transmission matrix into a wireless channel in M consecutive time periods. Signals transmitted by different transmission antennas in one time period correspond to different elements in one row of the transmission matrix in sequence; signals transmitted by one transmission antenna in different time periods correspond to different elements in one column of the transmission matrix.

In the embodiments of the present invention, the signals to be transmitted may be divided into groups in advance. When groups of signals to be transmitted are formed, they may be further be coded with the space-time coding.

The receiver implements the following process upon receiving the signals transmitted.

At block 205, received signals are obtained, and a weight-combination is performed for the received signals in M consecutive time periods according to the channel status information obtained by the receiver and the orthogonality of the transmission matrix.

In this embodiment, weighted coefficients may be computed according to the Maximal Ratio Combining principle and the channel status information. Then the weight-combination is performed for the received signals based on the weighted coefficients and the orthogonality of the transmission matrix.

At block 206, detection is respectively performed for the received signals after the weight-combination is performed to obtain estimations of transmitted signals corresponding to the received signals.

In the embodiments of the present invention, the receiver also receives training sequences from the transmitter, estimates the channel status information based on the training sequences, and returns the channel status information to the transmitter.

The preferable embodiments of the present invention are hereinafter explained respectively with references to the systems with different number of transmission antennas.

In a first embodiment, there is a system with two transmission antennas and a mobile terminal with one antenna as a receiver.

According to the transmission matrix of the embodiment shown in FIG. 2, when M is two, i.e. a system with two transmission antennas, the transmission matrix is:

$$\frac{\sqrt{2}}{\sqrt{|h_1|^2 + |h_2|^2}} \begin{pmatrix} x_1 & x_2 \\ -x_2 & x_1 \end{pmatrix} \begin{pmatrix} h_1^* & 0 \\ 0 & h_2^* \end{pmatrix}$$

that is, $$\begin{pmatrix} \frac{\sqrt{2}\, h_1^*}{\sqrt{|h_1|^2 + |h_2|^2}} x_1 & \frac{\sqrt{2}\, h_2^*}{\sqrt{|h_1|^2 + |h_2|^2}} x_2 \\ \frac{-\sqrt{2}\, h_1^*}{\sqrt{|h_1|^2 + |h_2|^2}} x_2 & \frac{\sqrt{2}\, h_2^*}{\sqrt{|h_1|^2 + |h_2|^2}} x_1 \end{pmatrix}$$

Two elements in one row of the transmission matrix correspond respectively to signals transmitted by two transmission antennas in one time period corresponding to the row, and two elements in one column of the transmission matrix correspond respectively to signals transmitted by one transmission antenna corresponding to the column in two consecutive time periods. $x_1$ and $x_2$ respectively indicate the two signals to be transmitted, and $h_m$ indicates a flat fading channel parameter from the number m(m=1,2) transmission antenna to the receiver, i.e. the channel status information.

In a time period 1, signals transmitted to the mobile terminal by an antenna 1 and an antenna 2 are respectively $$\frac{\sqrt{2}\, h_1^*}{\sqrt{|h_1|^2 + |h_2|^2}} x_1 \text{ and } \frac{\sqrt{2}\, h_2^*}{\sqrt{|h_1|^2 + |h_2|^2}} x_2,$$

and signals received by the mobile terminal are:

$$r_1 = \frac{\sqrt{2}\, |h_1|^2}{\sqrt{|h_1|^2 + |h_2|^2}} x_1 + \frac{\sqrt{2}\, |h_2|^2}{\sqrt{|h_1|^2 + |h_2|^2}} x_2 + n_1$$

Here, $r_1$ and $n_1$ respectively indicate the signals and AWGN received by the mobile terminal in the time period 1.

In a time period 2, signals transmitted to the mobile terminal by the antenna 1 and the antenna 2 are respectively $$\frac{-\sqrt{2}\, h_1^*}{\sqrt{|h_1|^2 + |h_2|^2}} x_2 \text{ and } \frac{\sqrt{2}\, h_2^*}{\sqrt{|h_1|^2 + |h_2|^2}} x_1,$$

and signals received by the mobile terminal are:

$$r_2 = -\frac{\sqrt{2}\, |h_1|^2}{\sqrt{|h_1|^2 + |h_2|^2}} x_2 + \frac{\sqrt{2}\, |h_2|^2}{\sqrt{|h_1|^2 + |h_2|^2}} x_1 + n_2$$

Here, $r_2$ and $n_2$ respectively indicate the signals and AWGN received by the mobile terminal in the time period 2.

The mobile terminal performs a weight-combination for the received signals, and signals $\tilde{x}_1$ and $\tilde{x}_2$ obtained are respectively:

$$\tilde{x}_1 = \frac{\sqrt{2}\,|h_1|^2}{\sqrt{|h_1|^2+|h_2|^2}} r_1 + \frac{\sqrt{2}\,|h_2|^2}{\sqrt{|h_1|^2+|h_2|^2}} r_2$$

and $$\tilde{x}_2 = \frac{\sqrt{2}\,|h_2|^2}{\sqrt{|h_1|^2+|h_2|^2}} r_1 - \frac{\sqrt{2}\,|h_1|^2}{\sqrt{|h_1|^2+|h_2|^2}} r_2$$

Finally, the mobile terminal may perform detection for $\tilde{x}_1$ and $\tilde{x}_2$ according to the maximum likelihood rule and obtain estimations of the two transmitted signals received from the transmission antennas.

Figure 3:
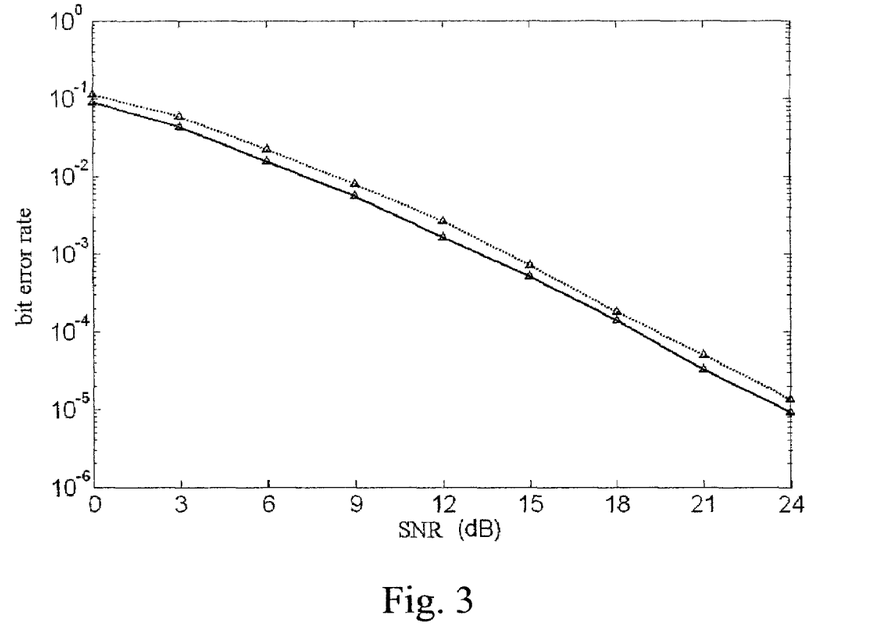
FIG. 3 is a schematic diagram illustrating a simulation result of the bit error rate of a system with two transmission antennas in accordance with an embodiment of the present invention.

FIG. 3 shows a simulation result of the bit error rate of a system with two antennas in accordance with an embodiment of the present invention. As shown in FIG. 3, a dashed line indicates the bit error rate of conventional STBC algorithms in a system with two antennas, and a real line indicates the bit error rate of a system with two antennas in accordance with the embodiment of the present invention. It can be seen from FIG. 3 that in the system with two antennas, the Signal-to-Noise Ratio (SNR) of the space-time coding algorithm in accordance with the embodiment of the present invention is larger than 1 dB compared with the STBC algorithms. In other words, with the same bit error rate, the embodiment of the present invention saves 1 dB of transmission power compared with the STBC algorithms; or with the same transmission power, the method provided by the embodiment of the present invention has a lower bit error rate.

In a second embodiment, there is a system with four transmission antennas and a mobile terminal with one antenna as a receiver.

According to the transmission matrix of the embodiment shown in FIG. 2, when M is four, i.e., a system with four transmission antennas, the transmission matrix is:

$$\frac{\sqrt{4}}{\sqrt{|h_1|^2+|h_2|^2+|h_3|^2+|h_4|^2}} \begin{pmatrix} x_1 & x_2 & x_3 & x_4 \\ -x_2 & x_1 & -x_4 & x_3 \\ -x_3 & x_4 & x_1 & -x_2 \\ -x_4 & -x_3 & x_2 & x_1 \end{pmatrix} \begin{pmatrix} h_1^* \\ h_2^* \\ h_3^* \\ h_4^* \end{pmatrix}$$

Here, $x_1$, $x_2$, $x_3$ and $x_4$ respectively indicate four signals to be transmitted, and $h_m$ indicates a flat fading channel parameter from the number m (m=1, 2, 3, 4) transmission antenna in a base station to a receiver, i.e., channel status information.

Four elements in one row of the transmission matrix correspond to signals transmitted respectively by four transmission antennas in one time period corresponding to the row, and four elements in one column of the transmission matrix correspond to signals transmitted respectively by one transmission antenna corresponding to the column in four consecutive time periods.

Therefore, signals received by the mobile terminal in four consecutive time periods are respectively:

$$r_1 = \frac{2}{\sqrt{|h_1|^2+|h_2|^2+|h_3|^2+|h_4|^2}} (|h_1|^2 x_1 + |h_2|^2 x_2 + |h_3|^2 x_3 + |h_4|^2 x_4) + n_1$$

-continued $$r_2 = \frac{2}{\sqrt{|h_1|^2+|h_2|^2+|h_3|^2+|h_4|^2}} (-|h_1|^2 x_2 + |h_2|^2 x_1 - |h_3|^2 x_4 + |h_4|^2 x_3) + n_2$$

$$r_3 = \frac{2}{\sqrt{|h_1|^2+|h_2|^2+|h_3|^2+|h_4|^2}} (-|h_1|^2 x_3 + |h_2|^2 x_4 + |h_3|^2 x_1 - |h_4|^2 x_2) + n_3$$

$$r_4 = \frac{2}{\sqrt{|h_1|^2+|h_2|^2+|h_3|^2+|h_4|^2}} (-|h_1|^2 x_4 + |h_2|^2 x_3 + |h_3|^2 x_2 + |h_4|^2 x_1) + n_4$$

Here, $r_1$, $r_2$, $r_3$, $r_4$ and $n_1$, $n_2$, $n_3$, $n_4$ respectively indicate the signals and AWGN received by the mobile terminal in a time period 1, a time period 2, a time period 3 and a time period 4.

The mobile terminal performs a weight-combination for the received signals, and signals $\tilde{x}_1$, $\tilde{x}_2$, $\tilde{x}_3$, $\tilde{x}_4$ obtained are respectively:

$$\tilde{x}_1 = \frac{2}{\sqrt{|h_1|^2+|h_2|^2+|h_3|^2+|h_4|^2}} (|h_1|^2 r_1 + |h_2|^2 r_2 + |h_3|^2 r_3 + |h_4|^2 r_4)$$

$$\tilde{x}_2 = \frac{2}{\sqrt{|h_1|^2+|h_2|^2+|h_3|^2+|h_4|^2}} (|h_2|^2 r_1 - |h_1|^2 r_2 - |h_4|^2 r_3 + |h_3|^2 r_4)$$

$$\tilde{x}_3 = \frac{2}{\sqrt{|h_1|^2+|h_2|^2+|h_3|^2+|h_4|^2}} (|h_3|^2 r_1 + |h_4|^2 r_2 - |h_1|^2 r_3 - |h_2|^2 r_4)$$

$$\tilde{x}_4 = \frac{2}{\sqrt{|h_1|^2+|h_2|^2+|h_3|^2+|h_4|^2}} (|h_4|^2 r_1 - |h_3|^2 r_2 + |h_2|^2 r_3 - |h_1|^2 r_4)$$

Finally, the mobile terminal may perform detection for $\tilde{x}_1$, $\tilde{x}_2$, $\tilde{x}_3$, and $\tilde{x}_4$ according to the maximum likelihood rule, and obtain estimations of the four transmitted signals received from the transmission antennas.

Figure 4:
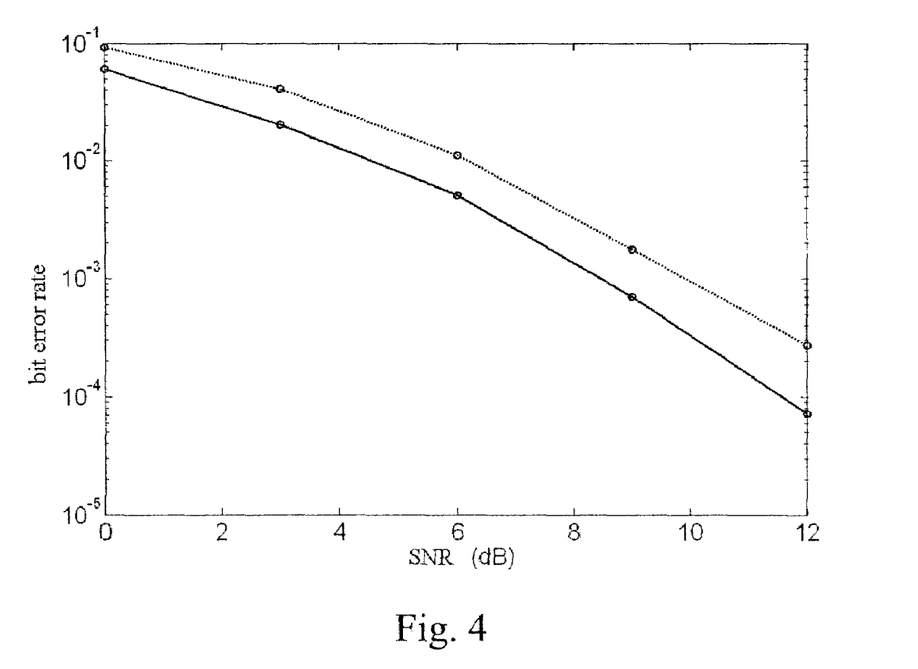
FIG. 4 is a schematic diagram illustrating a simulation result of the bit error rate of a system with four transmission antennas in accordance with an embodiment of the present invention.

FIG. 4 shows a simulation result of the bit error rate of a system with four antennas in accordance with an embodiment of the present invention. As shown in FIG. 4, a dashed line indicates the bit error rate of conventional STBC algorithms in a system with four antennas; a real line indicates the bit error rate of a system with four antennas in accordance with the embodiment of the present invention. It can be seen from FIG. 4 that in the system with four antennas, the SNR of the space-time coding algorithm in accordance with the embodiment of the present invention is approximately 2 dB compared with the conventional STBC algorithms. In other words, with the same bit error rate, the embodiment of the present invention saves about 2 dB of transmission power compared with the STBC algorithms; or with the same transmission power, the method provided by the embodiment of the present invention has a lower bit error rate.

In a third embodiment, there is a system with eight transmission antennas and a mobile terminal with one antenna as a receiver.

According to the transmission matrix of the embodiment shown in FIG. 2, when M is eight, i.e., a system with eight transmission antennas, the transmission matrix is:

$$\frac{\sqrt{8}}{\sqrt{\sum_{m=1}^{8}|h_m|^2}}\begin{pmatrix} x_1 & x_2 & x_3 & x_4 & x_5 & x_6 & x_7 & x_8 \\ -x_2 & x_1 & x_4 & -x_3 & x_6 & -x_5 & -x_8 & x_7 \\ -x_3 & -x_4 & x_1 & x_2 & x_7 & x_8 & -x_5 & -x_6 \\ -x_4 & x_3 & -x_2 & x_1 & x_8 & -x_7 & x_6 & -x_5 \\ -x_5 & -x_6 & -x_7 & -x_8 & x_1 & x_2 & x_3 & x_4 \\ -x_6 & x_5 & -x_8 & x_7 & -x_2 & x_1 & -x_4 & x_3 \\ -x_7 & x_8 & x_5 & -x_6 & -x_3 & x_4 & x_1 & -x_2 \\ -x_8 & -x_7 & x_6 & x_5 & -x_4 & -x_3 & x_2 & x_1 \end{pmatrix}$$

$$\begin{pmatrix} h_1^* & & & & & & & \\ & h_2^* & & & & & & \\ & & h_3^* & & & & & \\ & & & h_4^* & & & & \\ & & & & h_5^* & & & \\ & & & & & h_6^* & & \\ & & & & & & h_7^* & \\ & & & & & & & h_8^* \end{pmatrix}$$

Here, $x_1, x_2, x_3, x_4, x_5, x_6, x_7$ and $x_8$ respectively indicate eight signals to be transmitted, and $h_m$ indicates a flat fading channel parameter i.e. the channel status information from the number m(m=1, 2, 3, 4, 5, 6, 7, 8) transmission antenna in a base station to the receiver.

Eight elements in one row of the transmission matrix correspond to signals transmitted respectively by eight transmission antennas in one time period corresponding to the row, and eight elements in one column of the transmission matrix correspond to signals transmitted respectively by one transmission antenna corresponding to the column in eight consecutive time periods.

In the system with eight antennas in accordance with the embodiment of the present invention, signals received by the mobile terminal in eight consecutive time periods and estimations of the eight transmitted signals received from the eight transmission antennas obtained by the mobile terminal may be obtained by analogizing the methods of the two antennas system and four antennas system described above; therefore no more description will be given further.

It can be seen that the space-time coding and decoding methods in accordance with the present invention improve the bit error performance of the system, and the bit error rate is reduced no matter whether the signals to be transmitted are signals of complex numbers or signals of real numbers.

Further, the space-time coding and decoding methods in accordance with the embodiments of the present invention avoid conjugate operations on the signals to be transmitted. The transmission rate of the system is increased remarkably by using the methods provided by the embodiments of the present invention when the signals to be transmitted are complex numbers.

Based on the above space-time coding and decoding methods for wireless communication systems with multiple antennas, the embodiments of the present invention also provide apparatuses for space-time coding and decoding for wireless communication systems with multiple antennas.

Figure 5:
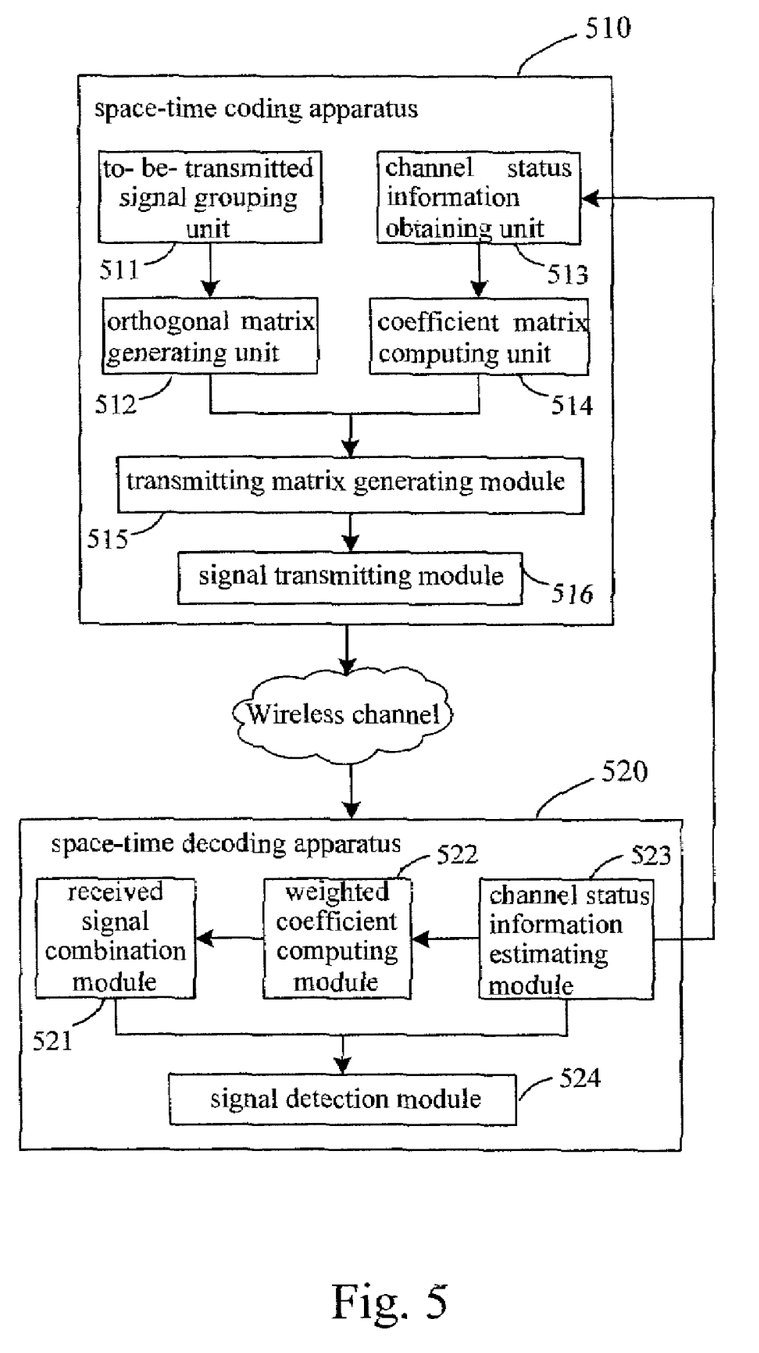
FIG. 5 is a schematic diagram of a structure of an apparatus for space-time coding and decoding in accordance with an embodiment of the present invention.

FIG. 5 shows a structure of apparatuses for space-time coding and decoding in accordance with an embodiment of the present invention. The apparatuses include a space-time coding apparatus 510, i.e., a transmission apparatus, and a space-time decoding apparatus 520, i.e., a receiver apparatus.

In the embodiment of the present invention, the space-time coding apparatus 510 includes an orthogonal matrix generating module, a coefficient matrix generating module, a transmission matrix generating module 515 and a signal transmission module 516.

The orthogonal matrix generating module generates an orthogonal matrix for signals to be transmitted and includes a to-be-transmitted signal grouping unit 511 and an orthogonal matrix generating unit 512 in the embodiment.

The to-be-transmitted signal grouping unit 511 divides the signals to be transmitted into groups according to the number of transmission antennas in a system.

The orthogonal matrix generating unit 512 generates the orthogonal matrix according to the grouped signals to be transmitted, and elements in the first row of the orthogonal matrix are the signals to be transmitted, and elements in the other rows of the orthogonal matrix are different arrangements of the signals and the reverse values of the signals to be transmitted.

The coefficient matrix generating module generates a coefficient matrix corresponding to the orthogonal matrix according to channel status information and includes a channel status information obtaining unit 513 and a coefficient matrix computing unit 514 in the embodiment.

The channel status information obtaining unit 513 obtains the channel status information.

The coefficient matrix computing unit 514 generates the coefficient matrix according to the channel status information.

The coefficient matrix computing unit 514 generates the coefficient matrix according to following formulas:

$$\begin{pmatrix} h_1^* & & & \\ & h_2^* & & \\ & & \ddots & \\ & & & h_M^* \end{pmatrix} \text{ or } \frac{\sqrt{M}}{\sqrt{\sum_{m=1}^{M}|h_m|^2}}\begin{pmatrix} h_1^* & & & \\ & h_2^* & & \\ & & \ddots & \\ & & & h_M^* \end{pmatrix}$$

Here, M is the number of transmission antennas, and $h_m$ is channel status information from the number m(m=1, 2, . . . , M) antenna in the transmitter to the receiver.

The transmission matrix generating module 515 generates a transmission matrix according to the orthogonal matrix and the coefficient matrix.

The signal transmission module 516 transmits signals via a transmission antenna according to the transmission matrix.

In an embodiment of the present invention, the space-time decoding apparatus 520 includes a received signal combination module 521, a signal detection module 524 and a channel status information estimating module 523.

The received signal combination module 521 performs a weight-combination for received signals. Here a transmission matrix corresponding to the received signals is orthogonal.

The signal detection module 524 obtains estimations of transmitted signals corresponding to the received signals by performing detection for the received signals.

The channel status information estimating module 523 estimates the channel status information and returning the channel status information to the transmitter.

The space-time decoding module further includes a weighted coefficient computing module 522.

The weighted coefficient computing module 522 computes weighted coefficients of the received signals according to the channel status information and the received signal combination module 521 further performs the weight-combination for the received signals according to the weighted coefficients.

Processing of the above modules is described above, and there will be no more descriptions.

In views of the above, in the embodiments of the present invention, signals to be transmitted are space-time coded according to channel status information obtained by a transmitter, therefore the bit error rate of a system is reduced and bit error performance of the system is improved.

Further, in the embodiments of the present invention, the signals to be transmitted are space-time coded according to the channel status information obtained by the transmitter to avoid conjugate operations for the signals to be transmitted. When there are more than one complex signals to be transmitted, the transmission rate of the system is increased remarkably.

The above is only preferred embodiments of the present invention. The protection scope of the present invention, however, is not limited to the above description. Any change or substitution, within the technical scope disclosed by the present invention, easily occurring to those skilled in the art, such as designing other forms of orthogonal matrixes or altering the coefficients corresponding to the elements in the orthogonal matrix, should be covered by the protection scope of the present invention. Hence the protection scope of the present invention should be determined by the statements in claims.

What is claimed is:

1. A method for space-time coding in a wireless system comprising M transmission antennas, the method comprising:
    a transmitter of the wireless system generating an orthogonal matrix for signals to be transmitted by the transmitter;
    the transmitter of the wireless system generating a coefficient matrix corresponding to the orthogonal matrix according to at least one of the formulas:

$$\begin{pmatrix} h_1^* & & & \\ & h_2^* & & \\ & & \ddots & \\ & & & h_M^* \end{pmatrix} \text{ and } \frac{\sqrt{M}}{\sqrt{\sum_{m=1}^{M} |h_m|^2}} \begin{pmatrix} h_1^* & & & \\ & h_2^* & & \\ & & \ddots & \\ & & & h_M^* \end{pmatrix},$$

wherein $h_m$ includes channel status information from the $m^{th}$ transmission antenna to a receiver; and
    the transmitter of the wireless system generating a transmission matrix according to the orthogonal matrix and the coefficient matrix.

2. The method of claim 1, wherein generating the orthogonal matrix for the signals to be transmitted comprises:
    dividing the signals to be transmitted into groups according to the number M of transmission antennas in the system; and
    generating the orthogonal matrix according to the signals grouped.

3. The method of claim 1, wherein generating the orthogonal matrix for the signals to be transmitted comprises:
    generating an M×M orthogonal matrix X according to M signals to be transmitted, wherein elements in the first row of the orthogonal matrix X are the M signals to be transmitted as $x_1, x_2, \ldots x_M$, and elements in the other rows are arrangements of the signals to be transmitted and the reverse values of the signals to be transmitted.

4. The method of claim 1, wherein generating the transmission matrix according to the orthogonal matrix and the coefficient matrix comprises:
    weighing each element in the orthogonal matrix according to the coefficient matrix.

5. The method of claim 4, wherein weighing each element in the orthogonal matrix according to the coefficient matrix comprises:
    premultiplying the coefficient matrix by the orthogonal matrix.

6. An apparatus for space-time coding in a wireless system having M transmission antennas, the apparatus comprising:
    an orthogonal matrix generating module, for generating an orthogonal matrix for signals to be transmitted;
    a coefficient matrix generating module, for generating a coefficient matrix corresponding to the orthogonal matrix according to at least one of the formulas:

$$\begin{pmatrix} h_1^* & & & \\ & h_2^* & & \\ & & \ddots & \\ & & & h_M^* \end{pmatrix} \text{ and } \frac{\sqrt{M}}{\sqrt{\sum_{m=1}^{M} |h_m|^2}} \begin{pmatrix} h_1^* & & & \\ & h_2^* & & \\ & & \ddots & \\ & & & h_M^* \end{pmatrix}$$

wherein $h_m$ includes channel status information from the $m^{th}$ transmission antenna to a receiver; and
    a transmission matrix generating module, for generating a transmission matrix according to the orthogonal matrix and the coefficient matrix.

7. The apparatus of claim 6, further comprising:
    a signal transmission module, for transmitting signals via a transmission antenna according to the transmission matrix.

8. The apparatus of claim 6, wherein the orthogonal matrix generating module comprises:
    a to-be-transmitted signal grouping unit, for dividing the signals into groups according to the number M of transmission antennas in the system; and
    an orthogonal matrix generating unit, for generating the orthogonal matrix according to the signals grouped, wherein elements in the first row of the orthogonal matrix are the signals to be transmitted, and elements in the other rows are arrangements of the signals to be transmitted and the reverse values of the signals to be transmitted.

9. The apparatus of claim 6, wherein the coefficient matrix generating module comprises:
    a channel status information obtaining unit, for obtaining the channel status information; and
    a coefficient matrix computing unit, for generating the coefficient matrix according to the channel status information.

* * * * *